(12) United States Patent
Alrajhi

(10) Patent No.: US 12,690,713 B1
(45) Date of Patent: Jul. 28, 2026

(54) COFFEE MACHINE THAT GRINDS BEANS CONTAINED IN CAPSULES

(71) Applicant: Abdulmohsin Alrajhi, Riyadh (SA)

(72) Inventor: Abdulmohsin Alrajhi, Riyadh (SA)

( * ) Notice: Subject to any disclaimer, the term of this patent is extended or adjusted under 35 U.S.C. 154(b) by 0 days.

(21) Appl. No.: 19/340,862

(22) Filed: Sep. 26, 2025

(51) Int. Cl.
| | |
|---|---|
| *A47J 31/42* | (2006.01) |
| *A47J 31/06* | (2006.01) |
| *A47J 31/40* | (2006.01) |
| *A47J 31/44* | (2006.01) |
| *A47J 31/46* | (2006.01) |
| *A47J 31/52* | (2006.01) |
| *A47J 42/40* | (2006.01) |
| *A47J 42/50* | (2006.01) |
| *B65D 85/804* | (2006.01) |

(52) U.S. Cl.
CPC ........... *A47J 31/42* (2013.01); *A47J 31/0673* (2013.01); *A47J 31/405* (2013.01); *A47J 31/407* (2013.01); *A47J 31/4407* (2013.01); *A47J 31/469* (2018.08); *A47J 31/525* (2018.08); *A47J 42/40* (2013.01); *A47J 42/50* (2013.01); *B65D 85/8061* (2020.05); *B65D 85/8064* (2020.05)

(58) Field of Classification Search
None
See application file for complete search history.

(56) References Cited

U.S. PATENT DOCUMENTS

| | | | | |
|---|---|---|---|---|
| 2004/0137128 A1* | 7/2004 | Hayes | ................... | A47J 31/002 |
| | | | | 426/591 |
| 2014/0242239 A1* | 8/2014 | Boggavarapu | ...... | A47J 31/4492 |
| | | | | 426/433 |
| 2018/0055289 A1* | 3/2018 | Al-Shaibani | .............. | B07B 1/42 |
| 2022/0313008 A1* | 10/2022 | Hadden | ................. | A47J 31/407 |
| 2023/0284821 A1* | 9/2023 | Xu | ....................... | A47J 31/3633 |
| 2025/0127324 A1* | 4/2025 | Pugliese | ............. | A47J 31/0673 |

* cited by examiner

*Primary Examiner* — Edward F Landrum
*Assistant Examiner* — Theodore J Evangelista
(74) *Attorney, Agent, or Firm* — ARC IP Law, PC; Joseph J. Mayo

(57) ABSTRACT

A coffee preparation machine that uses capsules containing whole coffee beans. The machine removes the whole beans from the capsule, grinds the beans, places ground coffee back into the capsule, adds hot water to brew coffee, and then ejects the used capsule after brewing is complete. An illustrative capsule may have two compartments: a lower compartment that initially contains whole beans, and an upper compartment where the ground coffee is placed after grinding. The machine may include a series of actuators to open the seals of the capsule, extract the beans, transport ground coffee and water into the upper compartment of the capsule, and move the used capsule out of the machine. The entire coffee preparation process may be automated so that a user need only place a capsule in the machine and press a button to initiate the sequence of actions.

10 Claims, 11 Drawing Sheets

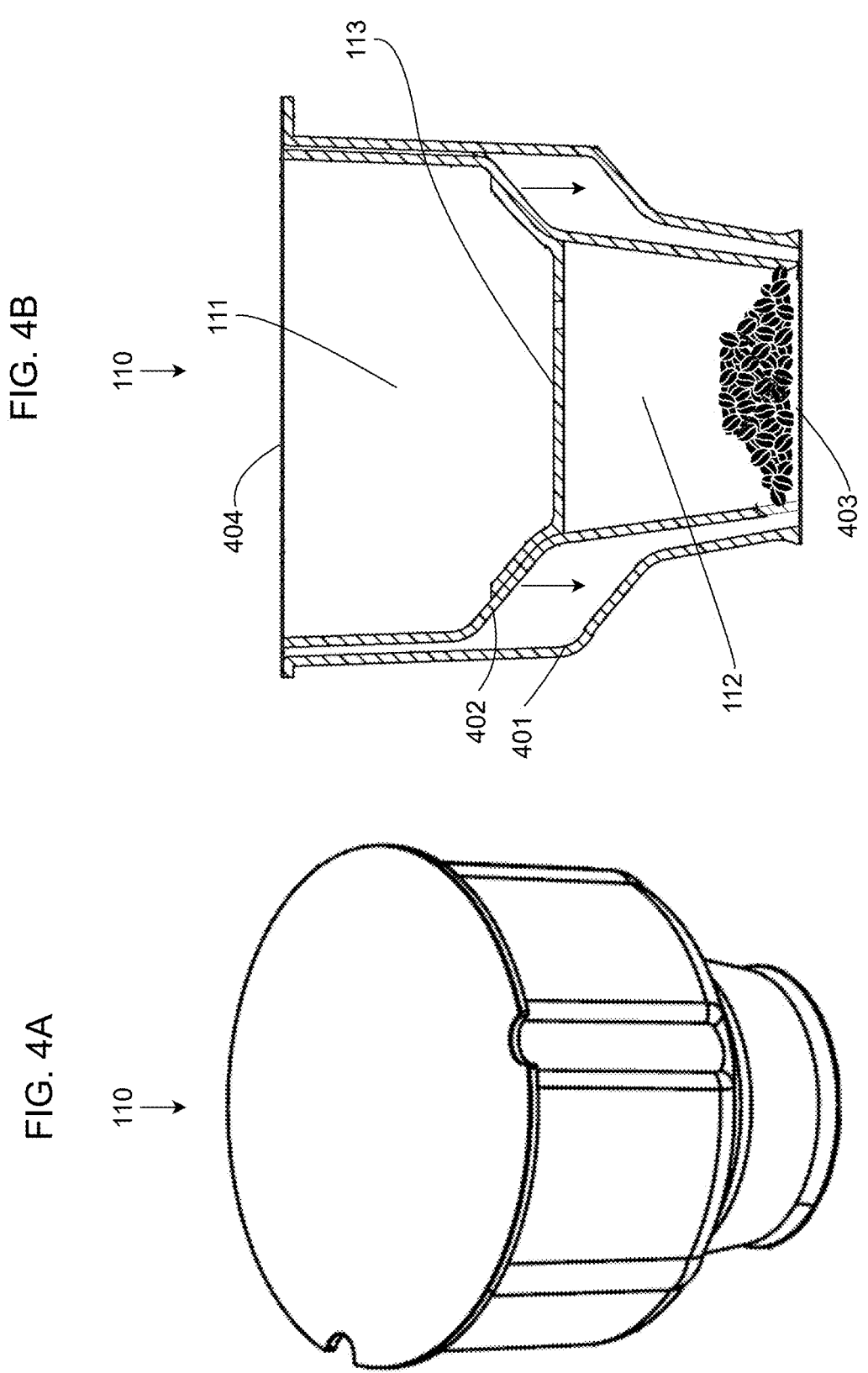

FIG. 5

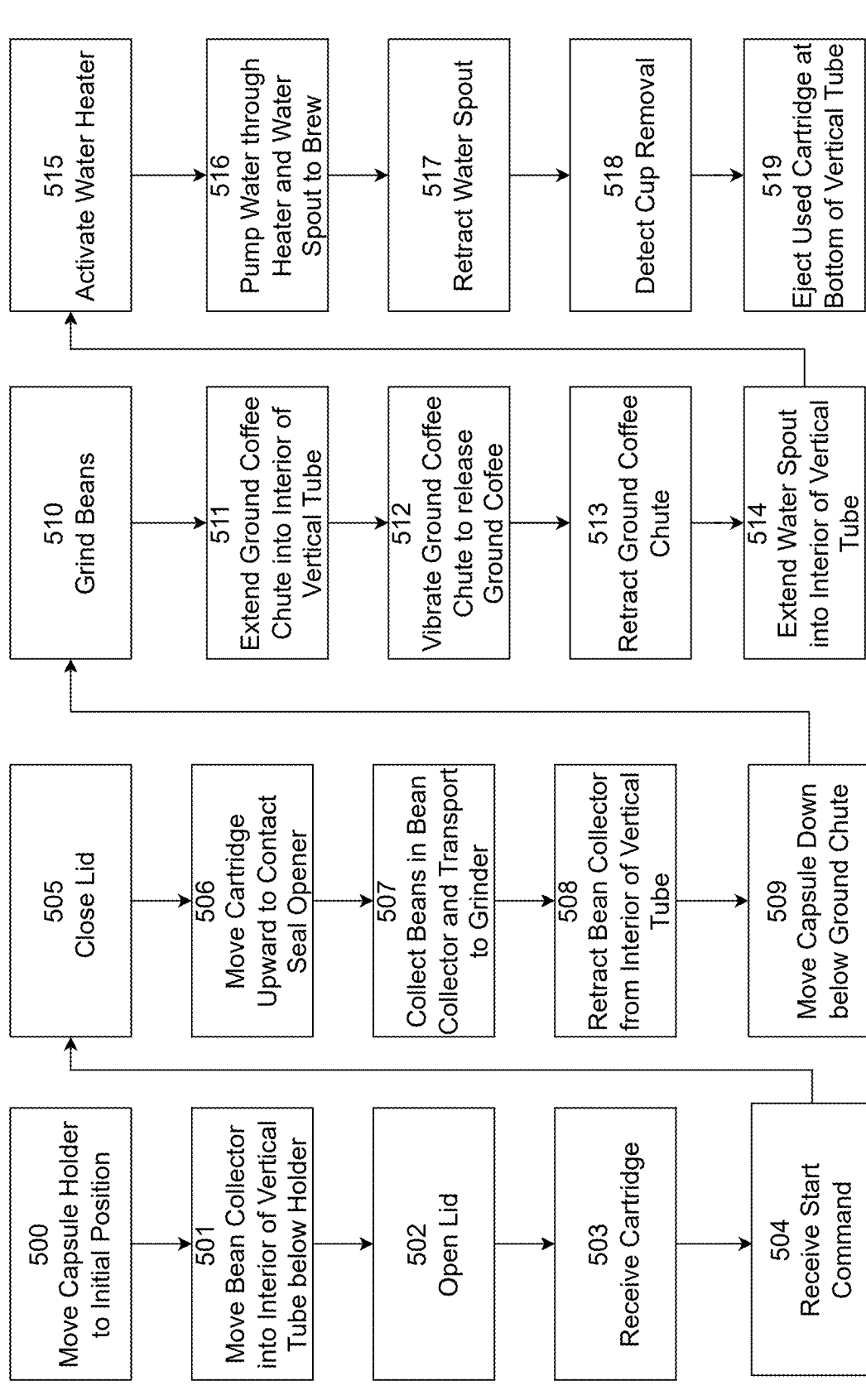

515 Activate Water Heater

516 Pump Water through Heater and Water Spout to Brew

517 Retract Water Spout

518 Detect Cup Removal

519 Eject Used Cartridge at Bottom of Vertical Tube

510 Grind Beans

511 Extend Ground Coffee Chute into Interior of Vertical Tube

512 Vibrate Ground Coffee Chute to release Ground Cofee

513 Retract Ground Coffee Chute

514 Extend Water Spout into Interior of Vertical Tube

505 Close Lid

506 Move Cartridge Upward to Contact Seal Opener

507 Collect Beans in Bean Collector and Transport to Grinder

508 Retract Bean Collector from Interior of Vertical Tube

509 Move Capsule Down below Ground Chute

500 Move Capsule Holder to Initial Position

501 Move Bean Collector into Interior of Vertical Tube below Holder

502 Open Lid

503 Receive Cartridge

504 Receive Start Command

COFFEE MACHINE THAT GRINDS BEANS CONTAINED IN CAPSULES

BACKGROUND OF THE INVENTION

Field of the Invention

One or more embodiments of the invention are related to the field of coffee preparation machines. More particularly, but not by way of limitation, one or more embodiments of the invention enable a coffee machine that grinds beans contained in capsules.

Description of the Related Art

Coffee machines that use capsules are widely available. These machines offer substantial convenience since a user need only insert a capsule containing ground coffee, press a button, and the machine brews fresh coffee. A disadvantage of these machines is that the quality of the brewed coffee generally does not match preparations that use freshly ground coffee beans, since the ground coffee in the capsules does not retain the flavor of freshly ground beans. There are no known systems that combine the convenience of capsules with the flavor of freshly ground beans.

For at least the limitations described above there is a need for a coffee machine that grinds beans contained in capsules.

BRIEF SUMMARY OF THE INVENTION

One or more embodiments described in the specification are related to a coffee machine that grinds beans contained in capsules. The machine may remove the whole beans from the capsule, grind the beans, return the ground coffee to the capsule, add hot water to brew the coffee, and then eject the used capsule.

One or more embodiments of the invention may include a water reservoir, a water heater, a water pump, a grinder, a bean collector coupled to the grinder, a ground coffee chute coupled to the grinder, a vertical tube configured to receive a capsule, and a controller coupled to the bean collector, the ground coffee chute, the water pump, the water heater, and the grinder. The capsule may have a lower compartment initially containing coffee beans, an upper compartment that is initially empty, and a filter between the lower compartment and the upper compartment. The controller may be configured to perform the following actions: release the coffee beans from the lower compartment, collect the coffee beans in the bean collector and transport the coffee beans to the grinder, activate the grinder to grind the coffee, yielding ground coffee, transport the ground coffee from the grinder through the ground coffee chute into the upper compartment, and activate the water pump and water heater to pump water from the water reservoir into the water heater, and to pump water from the water heater into the top compartment, where the heated water brews the ground coffee and brewed coffee flows through the filter and exits from the bottom compartment into a container placed below the vertical tube.

One or more embodiments of the invention may also include a capsule holder within the vertical tube that holds the capsule when it is inserted into the vertical tube, a capsule position actuator coupled to the capsule holder that moves the capsule vertically up and down within the vertical tube, and a seal opener configured to release the coffee beans from the lower compartment when the capsule position actuator moves the capsule to contact the seal opener. The controller may move the capsule to contact the seal opener to release the coffee beans from the lower compartment.

In one or more embodiments of the invention, the capsule may have an outer sleeve that is hollow with a top seal and a bottom seal, and an inner container that fits within the outer sleeve comprising the lower compartment and the upper compartment. The seal opener may be configured to open the top seal and to move the inner container downward relative to the outer sleeve, thereby opening the lower seal.

In one or more embodiments of the invention, the seal opener may have one or more blades that cut open the top seal, and one or more elements configured to engage with a top edge of the inner container to prevent the inner container from moving further upward.

One or more embodiments of the invention may include a lid coupled to the seal opener, and a lid actuator coupled to the lid and configured to open and close the lid. The controller may open the lid to receive the capsule and close the lid upon receiving a start command.

One or more embodiments of invention may include a bean collector actuator coupled to the bean collector that is configured to extend the bean collector into the interior of the vertical tube and to retract the bean collector from the interior of the vertical tube, and a ground coffee chute position actuator coupled to the ground coffee chute that is configured to extend the ground coffee chute into the interior of the vertical tube and to retract the ground coffee chute from the interior of the vertical tube. The controller may extend the bean collector into the interior of the vertical tube before moving the capsule to contact the seal opener to release the coffee beans from the lower compartment. It may retract the bean collector from the interior of the vertical tube after the coffee beans are transported to the grinder, and move the capsule downward in the vertical tube and extend the ground coffee chute into the interior of the vertical tube to transport the ground coffee from the grinder through the ground coffee chute into the upper compartment.

One or more embodiments of the invention may include a ground coffee chut vibration actuator coupled to the ground coffee chute. The controller may vibrate the ground coffee chute while transporting the ground coffee into the upper compartment.

One or more embodiments of the invention may include a water spout the receives water from the water heater, and a water spout actuator coupled to the water spout that is configured to extend the water spout into the interior of the vertical tube and to retract the water spout from the interior of the vertical tube. After ground coffee is transported from the grinder into the upper compartment, the controller may extend the water spout into the interior of the vertical tube to deliver heated water into the top compartment.

One or more embodiments of the invention may have a filling area located below the bottom of the vertical tube that is configured to receive the container that receives brewed coffee, and a presence sensor proximal to the filling area that detects whether the container is in the filling area. After the heated water brews the ground coffee in the upper container, when the presence sensor indicates that the container has been removed, the controller may move the capsule downward through the bottom of the vertical tube to the filling area for removal.

One or more embodiments of the invention may have a vertical tube that receives a capsule that has an outer sleeve that is hollow with a top seal and a bottom seal and an inner container that fits within the outer sleeve and contains a lower compartment initially containing coffee beans, an upper compartment that is initially empty, and a filter between the lower compartment and the upper compartment. It may have a water reservoir, a water heater, a water pump, a water spout that receives water from the water heater, and a water spout actuator coupled to the water spout that is configured to extend the water spout into the interior of the vertical tube and to retract the water spout from the interior of the vertical tube. It may have a grinder, a bean collector coupled to the grinder, a bean collector actuator coupled to the bean collector that is configured to extend the bean collector into the interior of the vertical tube and to retract the bean collector from the interior of the vertical tube, a ground coffee chute coupled to the grinder, a ground coffee chute position actuator coupled to the ground coffee chute that is configured to extend the ground coffee chute into the interior of the vertical tube and to retract the ground coffee chute from the interior of the vertical tube, and a ground coffee chute vibration actuator coupled to the ground coffee chute. It may have a capsule holder within the vertical tube that holds the capsule when it is inserted into the vertical tube, and a capsule position actuation coupled to the capsule hold that moves the capsule vertically up and down within the vertical tube. It may have a seal opener configured to release the coffee beans from the lower compartment when the capsule position actuator moves the capsule to contact the seal opener, where the seal opener has one or more blades configured to cut open the top seal, and one or more elements configured to engage with a top edge of the inner container to prevent the inner container from moving further upward. It may have a lid coupled to the seal opener, and a lid actuator coupled to the lid and configured to open the lid and to close the lid. It may have a filling area located below the bottom of the vertical tube and configured to receive a container that receives brewed coffee, and a presence sensor proximal to the filling area that detects whether the container is in the filling area. It may have a controller coupled to the bean collector actuator, the ground coffee chute position actuator, the ground coffee chute vibration actuator, the water pump, the water heater, the grinder, the lid actuator, the capsule position actuator, and the presence sensor. The controller may be configured to: open the lid to receive the capsule; extend the bean collector into the interior of the vertical tube; close the lid upon receiving a start command; move the capsule to contact the seal opener to release the coffee beans from the lower compartment; collect the coffee beans in the bean collector and transport the coffee beans to the grinder; retract the bean collector from the interior of the vertical tube; activate the grinder to grind the coffee beans, yielding ground coffee; move the capsule downward in the vertical tube and extend the ground coffee chute into the interior of the vertical tube to transport the ground coffee from the grinder through the ground coffee chute into the upper compartment; vibrate the ground coffee chute while transporting the ground coffee into the upper compartment; retract the ground coffee chute from the interior of the vertical tube; extend the water spout into the interior of the vertical tube; activate the water pump and the water heater to pump water from the water reservoir into the water heater, and from the water heater through the water spout into the top compartment, wherein heated water brews the ground coffee and brewed coffee flows through the filter and exits from the bottom compartment into a container placed below the vertical tube; and, after the heated water brews the ground coffee in the upper container, when the presence sensor indicates that the container has been removed, move the capsule downward through the bottom of the vertical tube to the filling area for removal.

BRIEF DESCRIPTION OF THE DRAWINGS

The above and other aspects, features and advantages of the invention will be more apparent from the following more particular description thereof, presented in conjunction with the following drawings wherein:

FIG. 4A shows a view of an illustrative capsule that may be used in one or more embodiments, and FIG. 4B shows a cross-section view of the capsule of FIG. 4A, which shows the internal structure with an inner container surrounded by an outer sleeve, and top and bottom compartments in the inner container separated by a filter.

FIG. 5 shows a flowchart of illustrative steps to process a capsule using the elements shown in FIG. 3.

FIGS. 6, 7A, 7B, 8, 9A, 9B, 10A, 10B, 10C, 11A, 11B, and 11C show the internal structure of the embodiment of FIG. 2 at various stages in the coffee preparation process.

FIG. 6 shows an initial configuration of the embodiment where it is ready to accept a capsule.

FIG. 7A shows the embodiment when the capsule has been inserted into the machine's vertical tube, and the lid has been closed.

FIG. 7B shows the embodiment when the capsule has been moved upwards to contact the seal opener under the lid, which opens the top and bottom seal of the capsule, releasing the beans into a chute that carries the beans to the grinder.

FIG. 8 shows a closeup view of the bottom of the lid, illustrating the blades that cut open the top seal of the capsule.

FIGS. 9A and 9B show vertical cross-section views of the capsule and the lid and blades.

FIG. 9A shows the capsule before it is pushed upwards against the blades under the lid; FIG. 9B shows the capsule after it is pushed upwards, illustrating how the blade cuts through the upper seal of the capsule and how a lip on the edge of the blade engages the inner compartment of the capsule, pushing this inner compartment downward through the lower seal to release the beans.

FIG. 10A continues the coffee preparation scenario after the beans have been transported to the grinder; the bean collector is retracted from the interior of the vertical tube.

FIG. 10B shows a subsequent step where the capsule is moved downward in the vertical tube to be in position to accept the ground coffee.

FIG. 10C shows dispensing of ground coffee into the upper compartment of the capsule via a ground coffee chute that is extended into the interior of the vertical tube.

FIG. 11A shows a subsequent step where the ground coffee chute is retracted and the water spout is extended into the interior of the vertical tube to dispense hot water into the capsule.

FIG. 11B shows the brewing process where the mixture of ground coffee and hot water is brewed and flows through the filter into a cup placed below the vertical tube.

FIG. 11C shows removal of the cup when brewing is complete, which causes the used capsule to be moved downward below the vertical tube to be removed.

DETAILED DESCRIPTION OF THE INVENTION

A coffee machine that grinds beans contained in capsules will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention enable a system for preparing coffee, or similar beverages, that uses capsules containing whole, rather than ground, material. The machine grinds or otherwise transforms the material prior to preparing a beverage using the transformed material. For example, without limitation, one or more embodiments of the invention may enable a coffee preparation machine that uses capsules containing whole, unground coffee beans; the machine receives the capsules, grinds the beans enclosed in the capsules, and brews coffee using the freshly ground coffee beans. This system provides the convenience of a capsule-based system as well as the superior flavor of freshly ground coffee. The examples shown in this specification use a coffee preparation machine for illustration; similar techniques may be used to prepare any type of beverage that uses ground or otherwise processed material, with the unprocessed material contained in a capsule.

Figure 1:
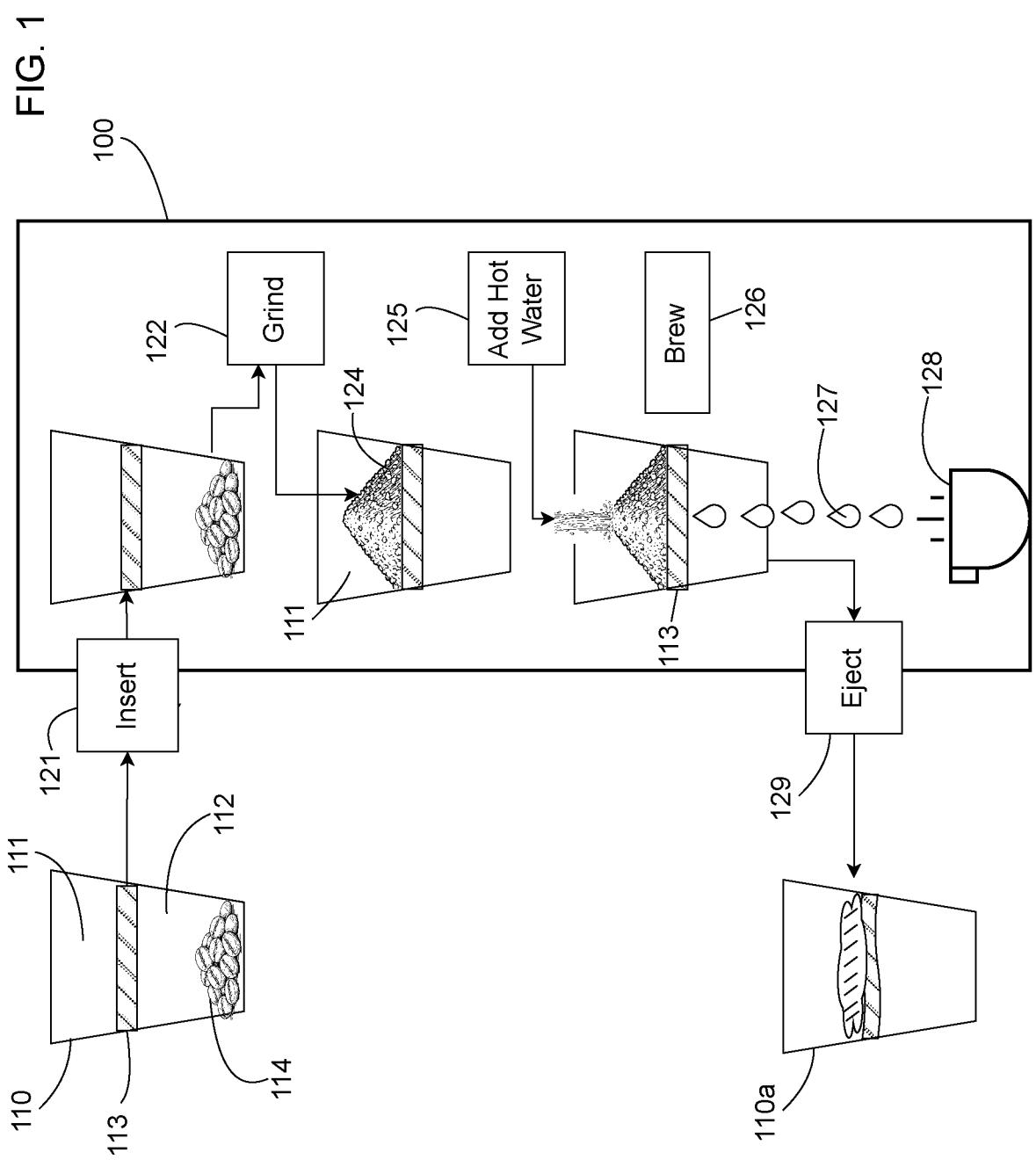
FIG. 1 shows a simplified block diagram of an illustrative embodiment of the invention, which illustrates how whole beans in a capsule are ground and brewed within the machine.

FIG. 1 shows a high-level block diagram with an overview of selected steps performed by an illustrative embodiment of the invention. Capsule 110 is processed by machine 100 to produce brewed coffee. The illustrative capsule 110 contains two compartments: a lower compartment 112 that initially contains whole coffee beans 114, and an upper compartment 111 that is initially empty. We use the terms "lower" and "upper" to designate these two compartments; however, in one or more embodiments either of the two compartments may be in any orientation or position relative to the other compartment. The two compartments are separated by a filter 113 that is used during the brewing process. Capsule 110 is inserted in step 121 into machine 100. The whole beans 114 are then removed from the lower compartment 112 and are ground in step 122 to produce ground coffee. The ground coffee is placed in upper compartment 111. Hot water is added in step 125 to the upper compartment 111 to mix with the ground beans and brew coffee in step 126. The brewed coffee 127 flows through filter 113 and exits the capsule into a cup 128 or other container (such as a carafe, mug, thermos bottle, etc.). When brewing is complete, the used capsule 110a is ejected from the machine in step 129. A benefit of this process is that a single capsule is used to contain both the original whole beans and the used ground coffee. This simplifies the experience for the user.

Figure 2:
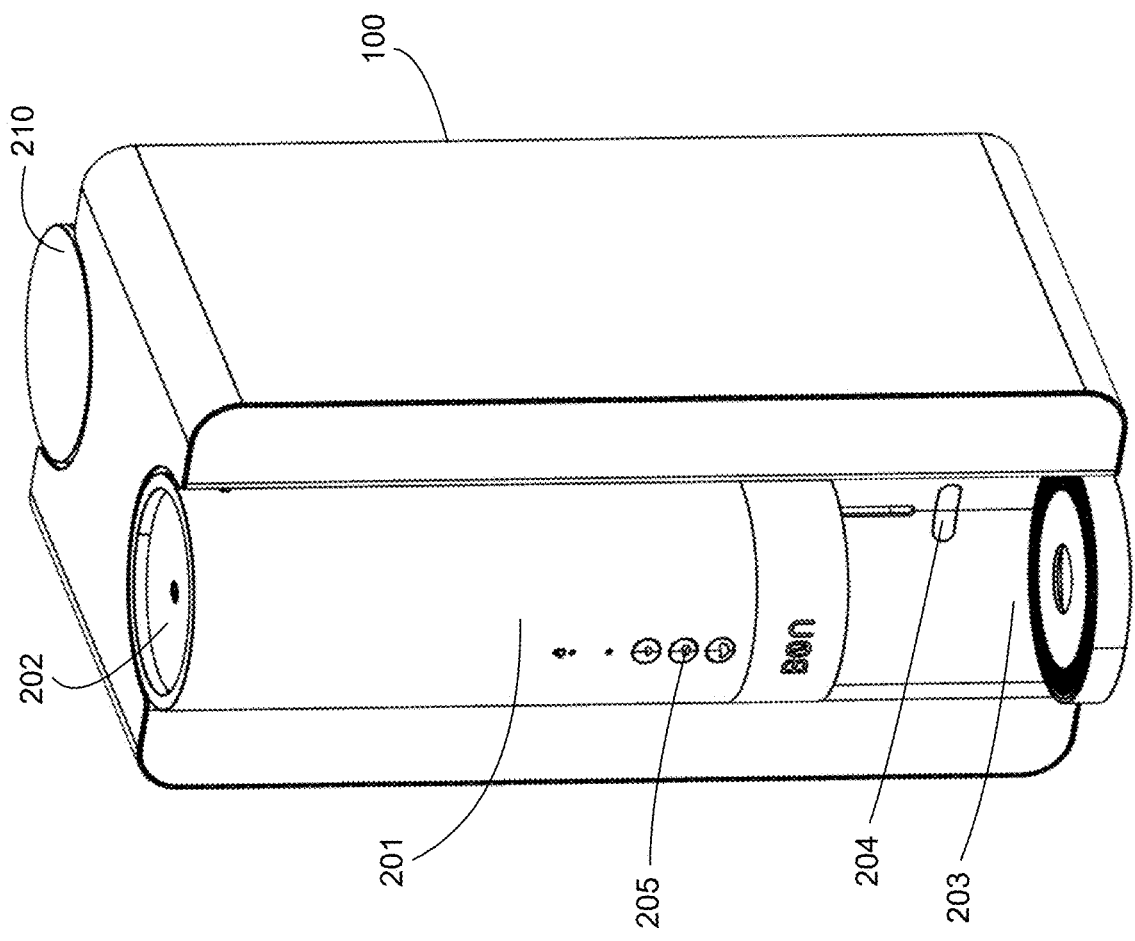
FIG. 2 shows a front view of an illustrative embodiment of the invention.

FIG. 2 shows an external view of an illustrative embodiment of machine 100; subsequent figures show selected internal components of the machine. Machine 100 includes a vertical tube 201 where the capsule is processed. A filling area 203 below the vertical tube receives a cup or other container that receives the brewed coffee; this area may also receive the used capsule after brewing is complete. A presence sensor 204 may detect whether a cup is currently placed in this filling area 203. A lid 202 at the top of vertical tube 201 may be opened to receive a capsule or closed to start the process of extracting beans from the capsule and performing brewing. A water reservoir 210 may be filled with water for one or more brewing cycles. One or more user controls 205 may be located on or near the machine; these controls may for example start the brewing cycle and may control various parameters such as the number of cups to brew or other factors such as water temperature.

Figure 3:
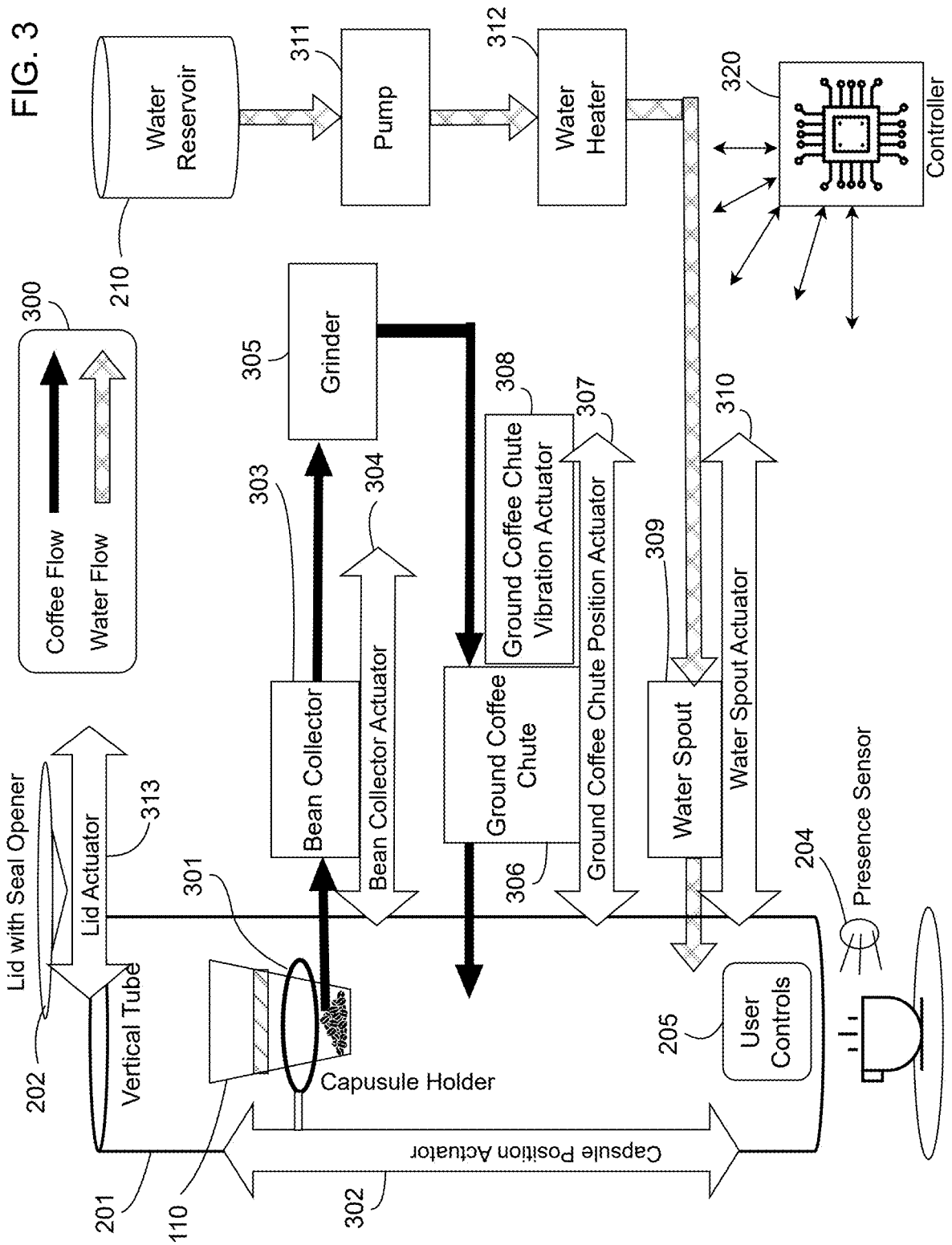
FIG. 3 shows a detailed block diagram of components, actuators, and control elements of an illustrative embodiment of the invention.

FIG. 3 shows an architectural block diagram of illustrative components that may be included within machine 100. Legend 300 shows the shading for arrows that represent the flow of coffee (beans and ground coffee) and of water through the machine. Lid 202 for vertical tube 201 may include a seal opener mechanism that opens the seals on the capsule, which are described below with respect to FIG. 4. Lid 202 may be actuated open or closed via a lid actuator 313; the actuator may for example slide or rotate the lid open or closed. When a capsule 110 is inserted into vertical tube 201, it rests in a capsule holder 301 that is coupled to a capsule position actuator 302. The capsule position actuator 302 moves the capsule holder, and thus the capsule, up and down within the vertical tube. When the seal holding the beans in the capsule is opened, the beans are collected by a bean collector 303 that transports the beans to grinder 305. The bean collector may be extended into and retracted from the interior of the vertical tube 201 by a bean collector actuator 304. Ground coffee produced by grinder 305 may be transported from the grinder back to the capsule 110 via aground coffee chute 306. The chute 306 may be extended into and retracted from the interior of the vertical tube 201 by a ground coffee chute position actuator 307. The chute may be vibrated by a ground coffee chute vibration actuator 308; this vibration assists the transport of the ground coffee from the grinder into the capsule. After ground coffee is placed into capsule 110, hot water is added to brew coffee. Water is pumped by pump 311 from water reservoir 210 through a water heater 312 and then through a water spout 309 into the capsule. The water spout 309 may be extended into and retracted from the interior of the vertical tube by a water spout actuator 310. A controller 320, such as a microprocessor or microcontroller, communicates with all of the actuators 313, 302, 304, 305, 307, 308, 310, 311, 312, with presence sensor 204 and other sensors within the machine, and with user controls 205. The controller 320 activates the actuators in a sequence to execute the coffee preparation process; illustrative steps are described below with respect to FIG. 5.

FIG. 4A shows an external view of an illustrative capsule 110, and FIG. 4B shows a vertical cross-section of capsule 110 to illustrate the capsule's internal structure. This illustrative capsule has an outer sleeve 401 and an inner container 402 that fits within outer sleeve 401. The inner container 402 is configured to slide downwards within the outer sleeve when pressed by the seal opener, as described below with respect to FIGS. 9A and 9B. The outer sleeve 401 has a top seal 404 and a bottom seal 403; these seals may be constructed for example of foil, paper, or plastic film. The inner container 402 is separated into the upper compartment 111 and the lower compartment 112 that initially holds the whole coffee beans, with filter 113 between upper compartment 111 and lower compartment 112.

FIG. 5 shows an illustrative sequence of steps that may be performed to execute the coffee preparation process. These steps and their sequence are illustrative; one or more embodiments of the invention may use a subset or superset of these steps and may arrange the steps in different orders. Some of the steps may be performed in parallel rather than sequentially in one or more embodiments.

Figure 6:
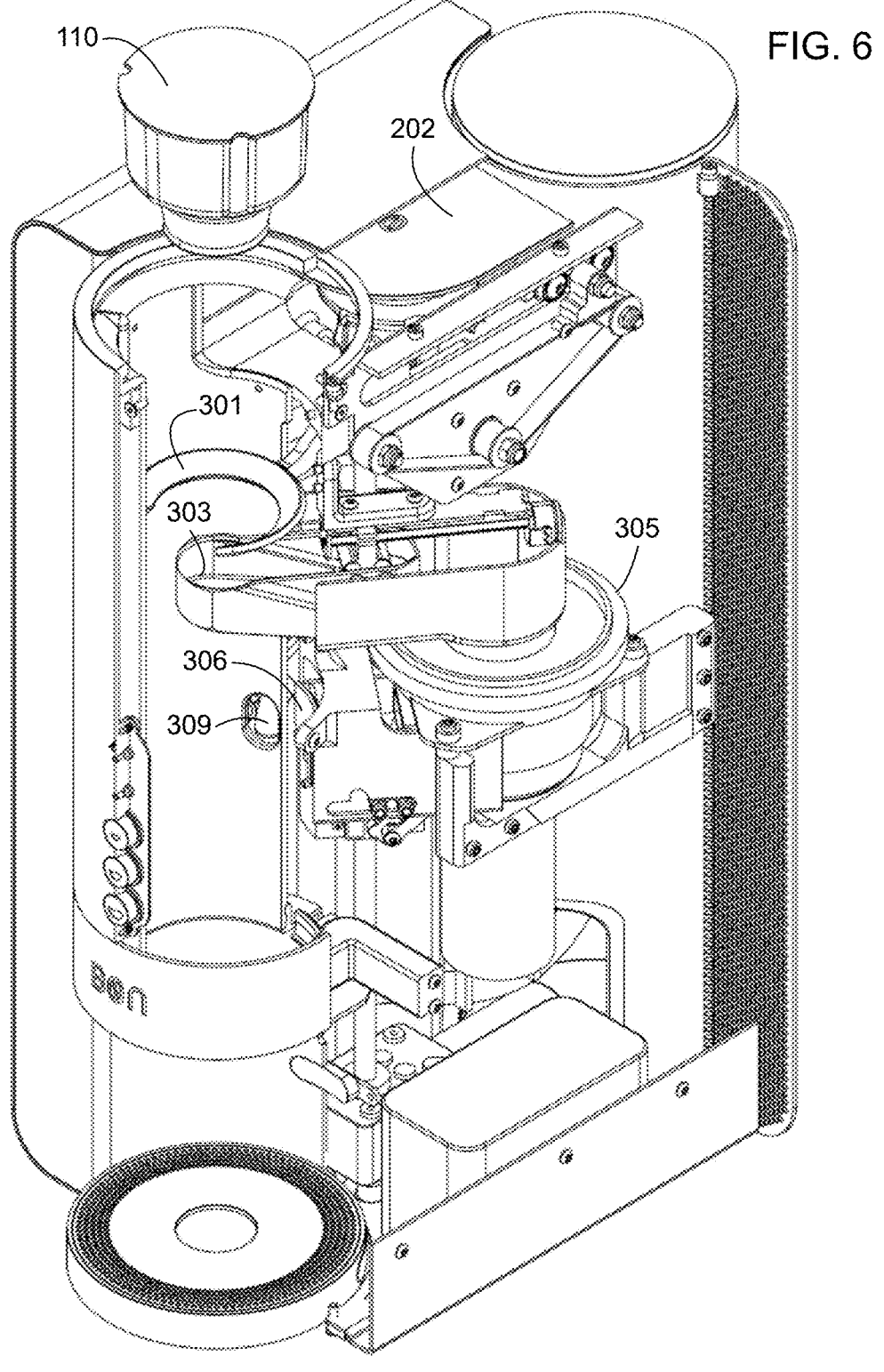

A first set of steps 500, 501, and 502 may prepare the machine to receive a capsule. These steps may for example be performed automatically when a machine is powered up, and they may be performed again at the end of a brewing cycle after a used cartridge is removed. Step 500 actuates the capsule position actuator 302 to move the capsule holder 301 into an initial position where it is ready to receive a capsule to begin the coffee preparation process. An illustrative initial capsule holder position is shown in FIG. 6; it is near the top of the vertical tube but low enough that the capsule can be contained well below the position of the lid. In step 501, the bean collector actuator 304 is actuated to move bean collector 303 into the interior of the vertical tube, so that it will be below the bottom seal of the capsule ready to receive coffee beans when the bottom seal is opened. In step 502, lid 202 is opened using lid actuator 313, so that a user can place the capsule into capsule holder within the vertical tube in step 503. In step 504, the system receives a start command to begin processing the capsule. This command may be initiated for example by a user control 205, or potentially by a sensor that senses that a capsule has been installed into the capsule holder. The sequence of steps 505 through 519 is initiated by this start command. First in step 505 lid 202 is closed using lid actuator 313. As described below, the bottom of the lid contains a seal opener that is configured to open both the top and bottom seals of the capsule when subsequent step 506 actuates the capsule position actuator 302 to move the capsule holder 301, and the contained capsule, upward in the vertical tube to contact the seal opener. The force of the capsule against the seal opener below the lid opens the lower seal of the capsule, releasing the whole beans into the interior of the vertical tube. It also opens the upper seal of the capsule to prepare it to receive the ground coffee. In step 507, the whole beans are collected in the bean collector 303 and transported to grinder 305. In step 508, the bean collector 303 is retracted from the vertical tube by actuator 304; this step clears a path in the vertical tube for the capsule to move downward in step 509 so that it is in a position to receive ground coffee and hot water for the brewing step. Beans are ground in step 510 by the grinder 305. In step 511, the ground coffee chute position actuator 307 moves the ground coffee chute 306 into the interior of the vertical tube, where its exit is above the upper compartment of the capsule. Ground coffee from the grinder flows through the chute, further encouraged to flow by actuation of the ground coffee chute vibration actuator 308 in step 512. When the ground coffee has exited the grinder, step 513 retracts the ground coffee chute 306 using actuator 307, and then in step 514 the water spout 309 is moved into the interior of the vertical tube, above the upper capsule compartment, by water spout actuator 310. Water heater 312 is activated in step 515, and pump 311 is activated in step 516 to pump water from the reservoir into the water heater, and to pump hot water from the water heater through water spout 309 into the upper compartment of the capsule, where the hot water mixes with the ground coffee and creates brewed coffee that flows through the capsule filter, out the bottom of the capsule, and into the cup or other container in the filling area below the vertical tube. Once the filling of the capsule with hot water is complete, which may require several cycles of water dispensing depending on the size of the capsule and the amount of coffee desired, step 517 retracts the water spout using actuator 310. The system then waits in step 518 for the presence sensor 204 to indicate that the cup or container with brewed coffee is removed from the filling area. It then moves the capsule downward using capsule position actuator 302 to the filling area below the tube to eject the capsule from the machine, so that the user can take the used capsule and dispose of it or recycle it. When the presence sensor detects that the used capsule has been removed, the process may return to step 500 to prepare the machine for a subsequent cycle.

FIG. 6 and subsequent figures illustrate selected steps of the flowchart of FIG. 5 for the machine embodiment shown in FIG. 2. The outer shell of the machine is hidden to show the internal components. FIG. 6 shows the machine after steps 500, 501, and 502 have been performed. The machine is prepared to receive capsule 110, which has not yet been inserted. Lid 202 is actuated open to expose the interior of the vertical tube. Capsule holder 301 is in position to receive the capsule so that the lid can then be closed above the top of the capsule. Bean collector 303 is extended into the vertical tube where it will be just below the bottom seal of capsule 110 when the capsule is placed in the holder 301. Bean collector 303 will transport the beans to grinder 305. This view of the machine also shows the tips of ground coffee chute 306 and water spout 309, which are both retracted.

Figures 7A, 7B:
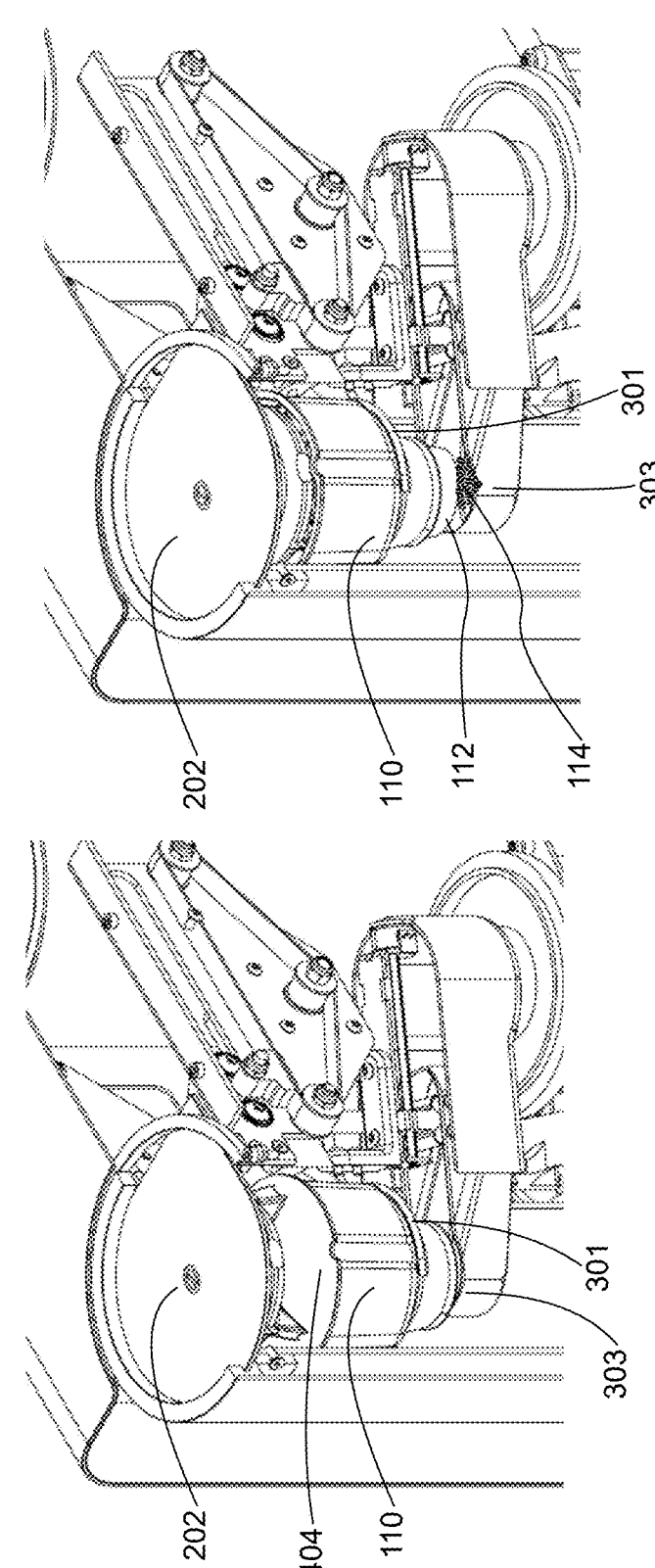
Figures 9A, 9B:
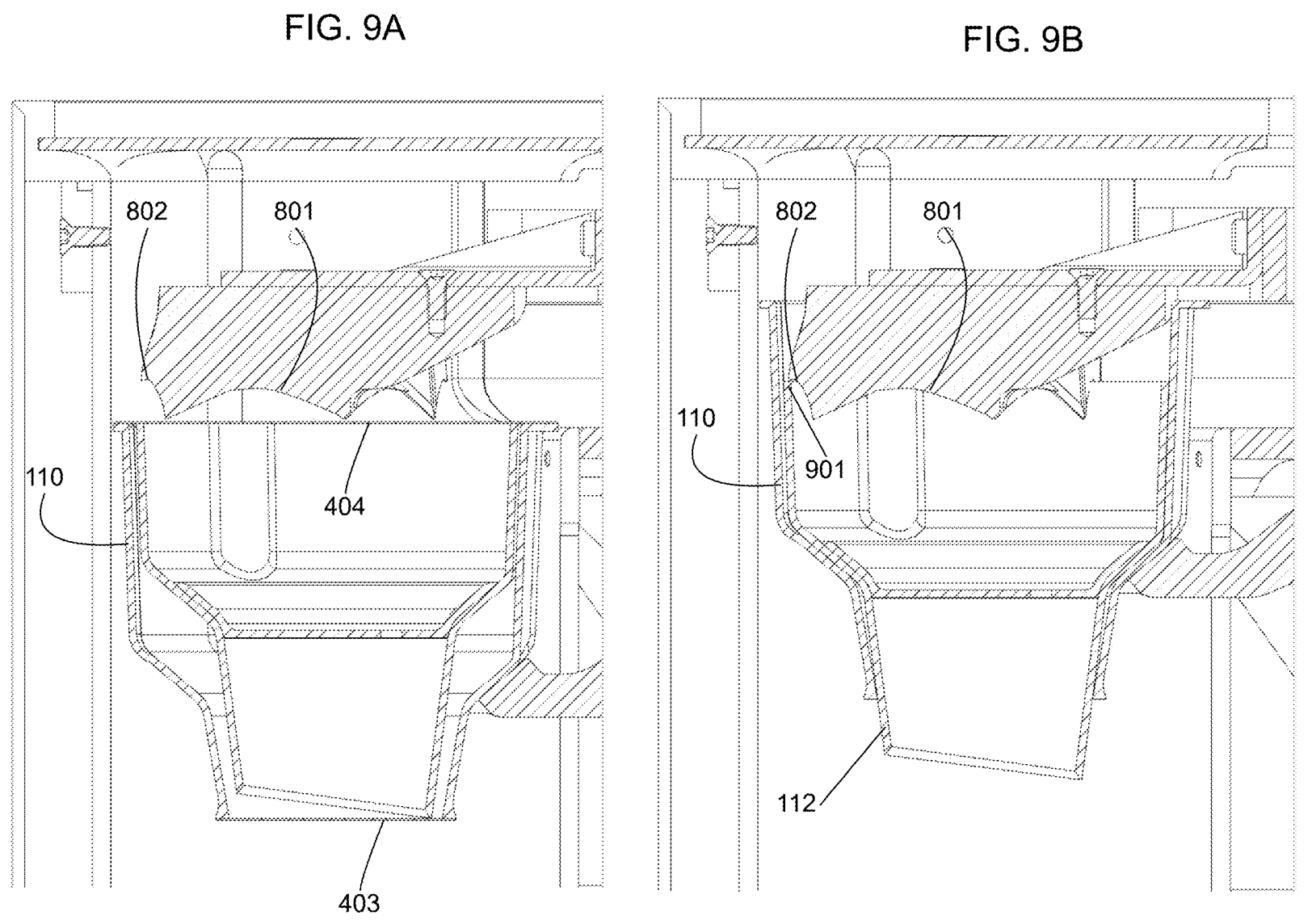

FIG. 7A shows the state of the machine after steps 503, 504, and 505. Capsule 110 has been spaced in capsule holder 301, the user has initiated the process by pressing a start button for example, and lid 202 has been closed by the lid actuator. The top seal 404 of capsule 110 is below the seal opening mechanism underneath lid 202, and the bean collector 303 is below the bottom seal of capsule 110. FIG. 7B shows the state of the machine after step 506. Cartridge 110 has been moved upwards in the vertical tube so that the top seal 404 of the cartridge contacts the seal opener below lid 202. Blades on the seal opener push through the top seal to open the top compartment of the inner container of the capsule. In addition, as illustrated in FIGS. 9A and 9B, a hook on the seal opener engages with the top of the inner container of the capsule to hold it down as the capsule moves upward, which causes the relative position of the inner container to move downward relative to the outer sleeve; this causes the lower portion 112 of the inner container to punch through the lower seal of the capsule, releasing the enclosed beans 114 into the bean collector 303.

Figure 8:
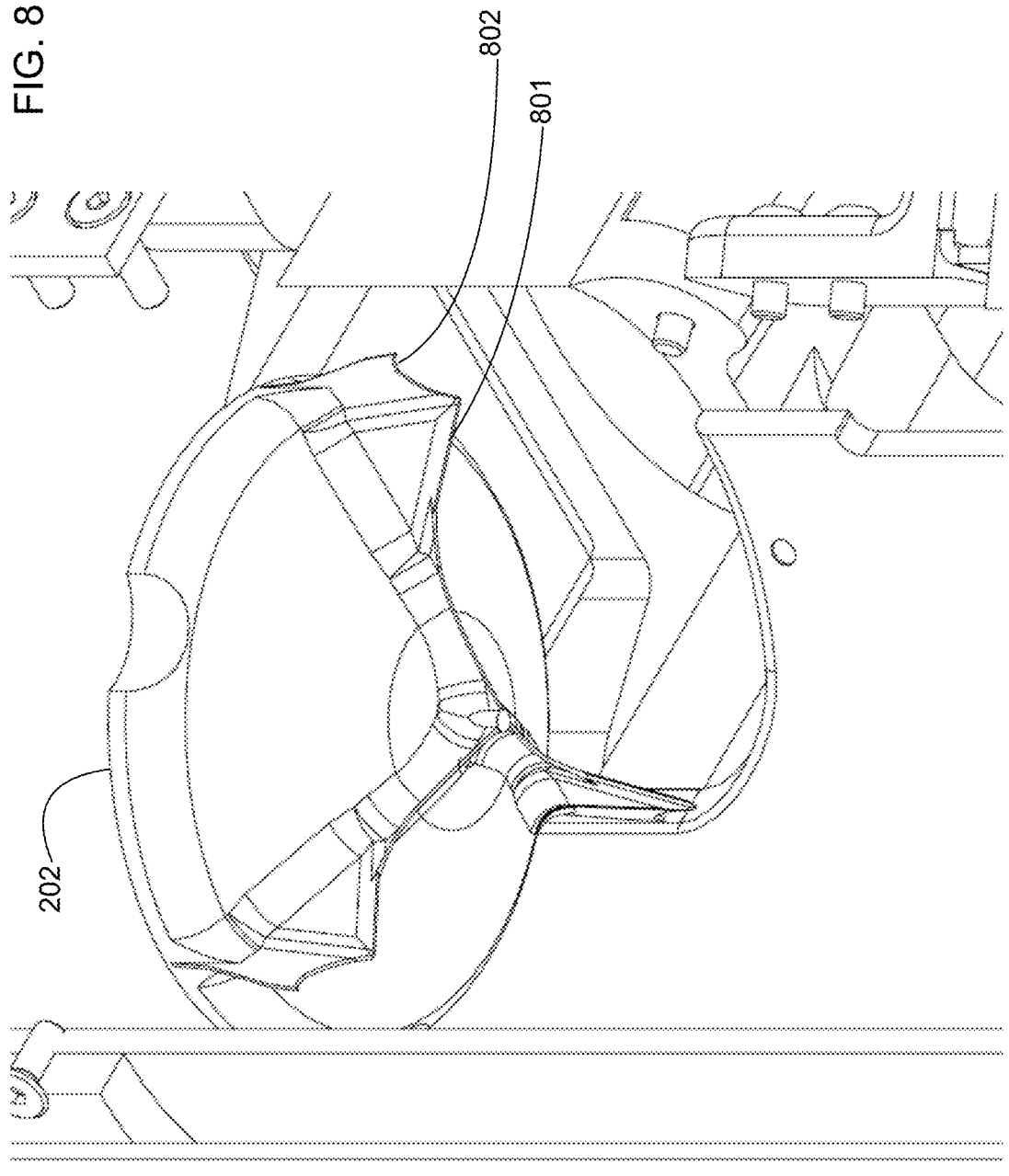

FIG. 8 shows a closeup view of the bottom of lid 202. The bottom of the lid has blades 801 that cut through the top seal of the capsule. This mechanism is illustrative; one or more embodiments may use any type of seal opener that cuts, punches, unrolls, suctions, slides, rotates, or otherwise opens the seal or seals of the capsule. In the embodiment shown in FIG. 8, the bottom of lid 202 has three blades; any number of blades or other opening features may be used in one or more embodiments of the invention. A hook, lip, indentation, or other feature 802 on one or more of the blades may engage with the inner container of the capsule, as shown in greater detail in vertical cross-section views of FIGS. 9A and 9B. FIG. 9A shows a cross-section view of capsule 110 just before it is pushed up against the seal opener with blade 801 and hook 802. In this state, both the top seal 404 and the bottom seal 403 of the capsule 110 are intact. FIG. 9B shows the same view after capsule 110 has been moved upwards by the capsule position actuator 302. Blade 801 (and other blades if present) cut through the upper seal 404 of the capsule. As the capsule moves upwards, the top 901 of the inner container within the capsule contacts the hook 802 on the seal opener; this holds the inner container in position as the outer sleeve continues to move upwards. This causes the outer sleeve to move relative to the inner container, and the lower compartment 112 of the inner container of the capsule pushes through the lower seal 403, opening the seal and releasing the contained whole coffee beans.

Figures 10A, 10B, 10C:
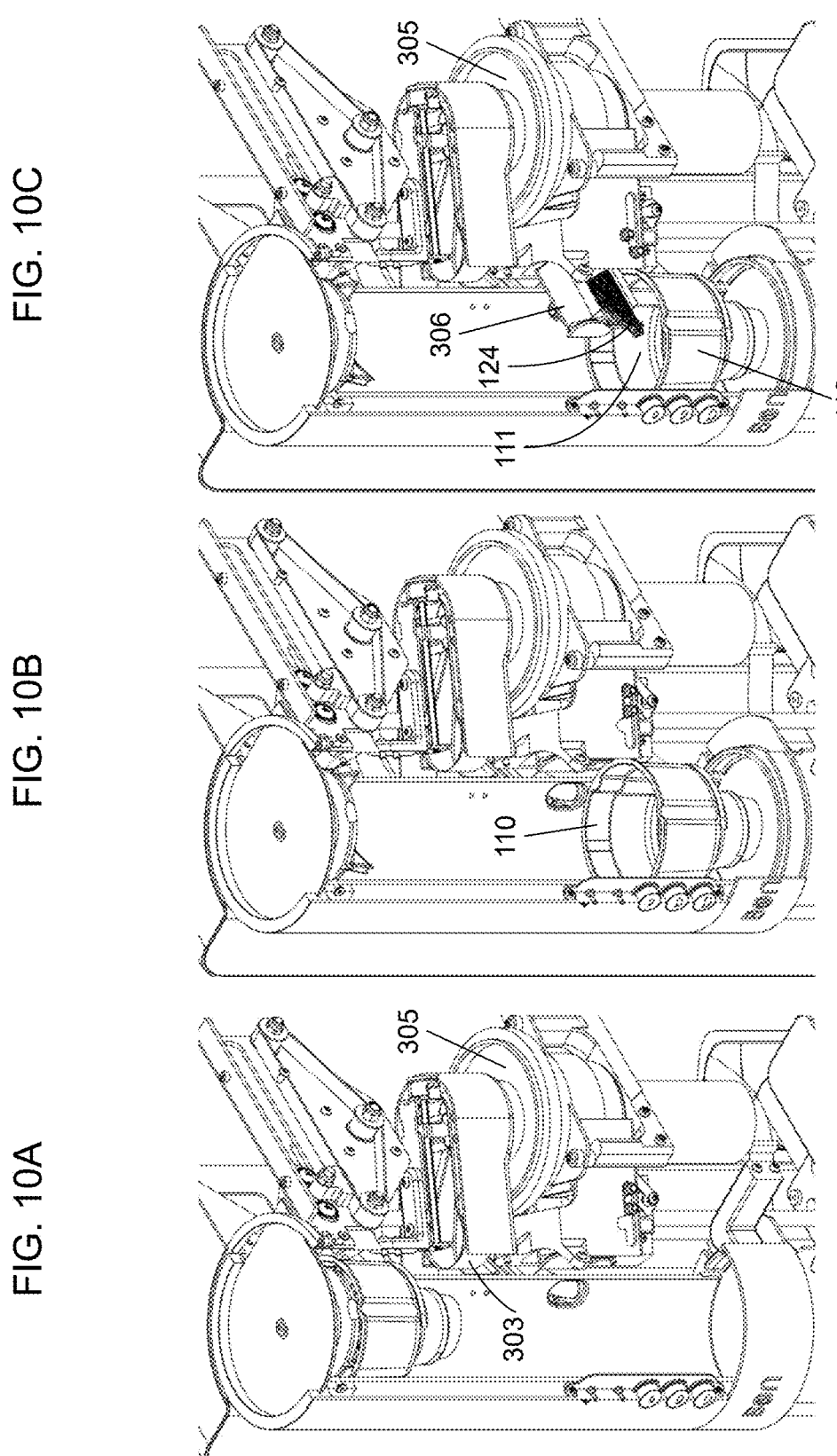

FIG. 10A shows the next step in the coffee preparation process, where bean collector 303 is retracted from the vertical tube after the coffee beans have been transported into grinder 305. As shown in FIG. 10B, the capsule 110 is then moved downward through the vertical tube to a position where the top of the capsule is below the position of the ground coffee chute 306. As shown in FIG. 10C, the ground coffee chute 306 is then extended into the interior of the vertical tube, and ground coffee from grinder 306 is released into the upper compartment of capsule 110.

Figures 11A, 11B, 11C:
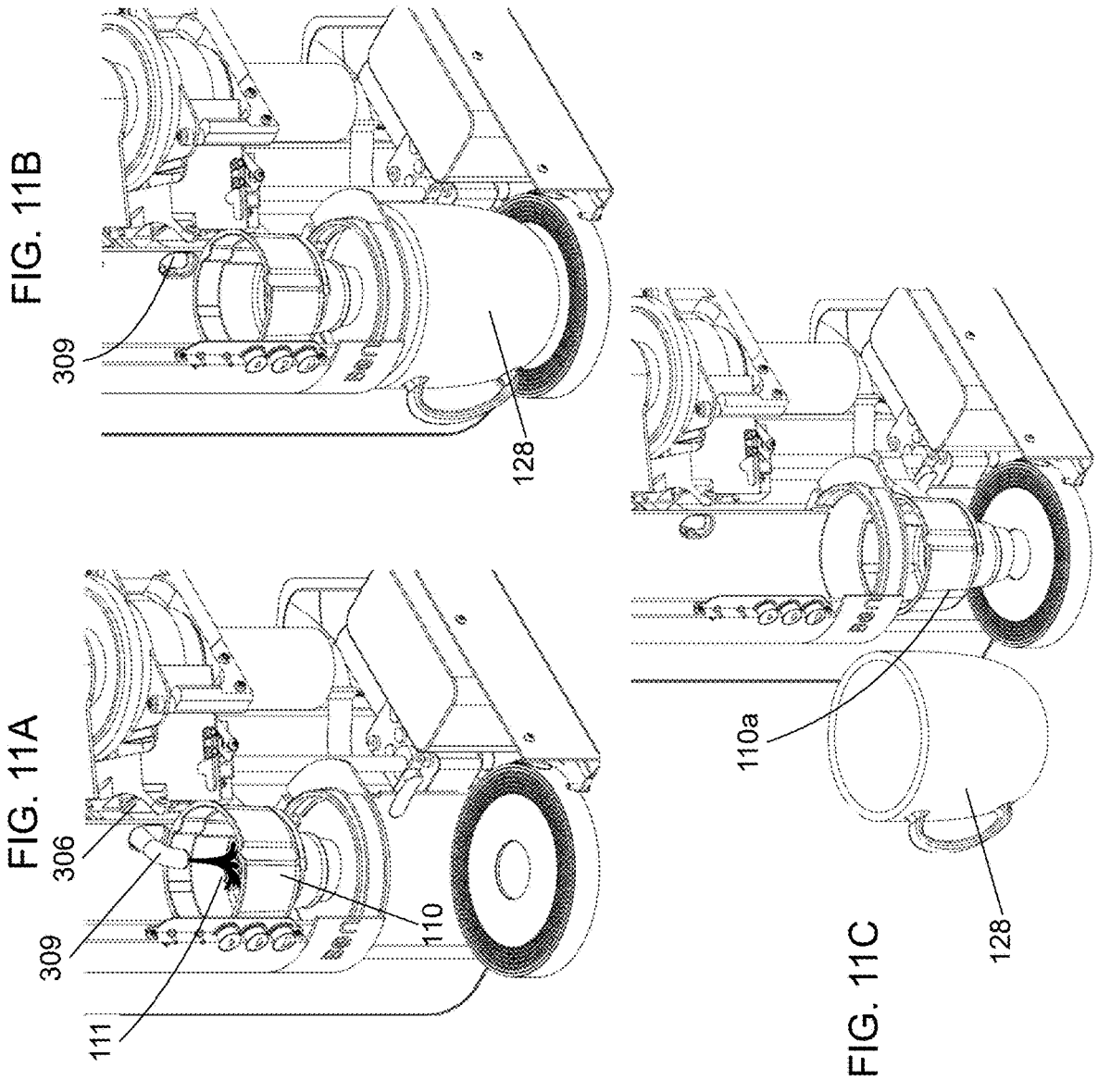

FIG. 11A shows the state of the machine after the next steps of retracting the ground coffee chute 306, extending the water spout 309, and pumping water through the water heat and out the spout 309 into the upper compartment 111 of capsule 110. As shown in FIG. 11B, when the desired quantity of water has been dispensed, the water spout 309 is retracted and brewed coffee flows through the filter of the capsule into cup or container 128 placed in the filling area. As shown in FIG. 11C, when brewing is complete and the user removes the cup or container 128, this action is detected by the presence sensor and the used capsule 110*a* is moved downward below the vertical tube to the filling area, where it can be removed by the user and discarded or recycled.

While the invention herein disclosed has been described by means of specific embodiments and applications thereof, numerous modifications and variations could be made thereto by those skilled in the art without departing from the scope of the invention set forth in the claims.

What is claimed is:

1. A coffee machine that grinds beans contained in capsules, comprising:
a water reservoir;
a water heater;
a water pump;
a grinder;
a bean collector coupled to the grinder;
a ground coffee chute coupled to the grinder;
a vertical tube configured to receive a capsule, wherein the capsule comprises:
a lower compartment initially containing coffee beans;
an upper compartment that is initially empty; and
a filter between the lower compartment and the upper compartment;
a seal opener configured to release the coffee beans from the lower compartment;
one or more actuators configured to move at least one of the bean collector and the ground coffee chute; and,
a controller coupled to the bean collector, the ground coffee chute, the water pump, the water heater, the grinder, the seal opener, and the one or more actuators, wherein the controller is configured to:
actuate the seal opener to release the coffee beans from the lower compartment and actuate the one or more actuators to position the bean collector to receive the coffee beans and transport the coffee beans to the grinder;
activate the grinder to grind the coffee beans, yielding ground coffee;

actuate the one or more actuators to transport the ground coffee from the grinder through the ground coffee chute into the upper compartment; and
activate the water pump and the water heater to pump water from the water reservoir into the water heater, and from the water heater into the upper compartment, wherein heated water brews the ground coffee and brewed coffee flows through the filter and exits from the lower compartment into a container placed below the vertical tube.

2. The coffee machine that grinds beans contained in capsules of claim 1, further comprising:
a capsule holder within the vertical tube that holds the capsule when it is inserted into the vertical tube;
a capsule position actuator coupled to the capsule holder that moves the capsule vertically up and down within the vertical tube;
wherein the seal opener is configured to release the coffee beans from the lower compartment when the capsule position actuator moves the capsule to contact the seal opener;
wherein the controller is further configured to:
actuate the capsule position actuator to move the capsule to contact the seal opener to release the beans from the lower compartment.

3. The coffee machine that grinds beans contained in capsules of claim 2, wherein:
the capsule comprises:
an outer sleeve that is hollow with a top seal and a bottom seal; and
an inner container that fits within the outer sleeve, comprising the lower compartment and the upper compartment;
the seal opener is further configured to:
open the top seal; and,
move the inner container downward relative to the outer sleeve, thereby opening the bottom seal.

4. The coffee machine that grinds beans contained in capsules of claim 3, wherein the seal opener comprises:
one or more blades configured to cut open the top seal; and,
one or more elements configured to engage with a top edge of the inner container to prevent the inner container from moving further upward.

5. The coffee machine that grinds beans contained in capsules of claim 2, further comprising:
a lid coupled to the seal opener;
a lid actuator coupled to the lid and configured to open the lid and to close the lid;
wherein the controller is further configured to:
actuate the lid actuator to open the lid to receive the capsule; and,
actuate the lid actuator to close the lid upon receiving a start command.

6. The coffee machine that grinds beans contained in capsules of claim 2, wherein the one or more actuators comprise
a bean collector actuator coupled to the bean collector and configured to extend the bean collector into an interior of the vertical tube and to retract the bean collector from the interior of the vertical tube;
a ground coffee chute position actuator coupled to the ground coffee chute and configured to extend the ground coffee chute into the interior of the vertical tube and to retract the ground coffee chute from the interior of the vertical tube;

wherein the controller is further configured to:

actuate the bean collector actuator to extend the bean collector into the interior of the vertical tube before moving the capsule to contact the seal opener to release the coffee beans from the lower compartment;

actuate the bean collector actuator to retract the bean collector from the interior of the vertical tube after the coffee beans are transported to the grinder;

actuate the capsule position actuator to move the capsule downward in the vertical tube; and actuate the ground coffee chute position actuator to extend the ground coffee chute into the interior of the vertical tube to transport the ground coffee from the grinder through the ground coffee chute into the upper compartment.

7. The coffee machine that grinds beans contained in capsules of claim 6, wherein the one or more actuators further comprise a ground coffee chute vibration actuator coupled to the ground coffee chute;

wherein the controller is further configured to:

actuate the ground coffee chute vibration actuator to vibrate the ground coffee chute while transporting the ground coffee into the upper compartment.

8. The coffee machine that grinds beans contained in capsules of claim 6, further comprising:

a water spout that receives water from the water heater;

wherein the one or more actuators further comprise a water spout actuator coupled to the water spout and configured to extend the water spout into the interior of the vertical tube and to retract the water spout from the interior of the vertical tube;

wherein the controller is further configured to:

after the ground coffee is transported from the grinder into the upper compartment, actuate the water spout actuator to extend the water spout into the interior of the vertical tube to deliver heated water into the upper compartment.

9. The coffee machine that grinds beans contained in capsules of claim 2, further comprising:

a filling area located below a bottom of the vertical tube and configured to receive the container that receives brewed coffee;

a presence sensor proximal to the filling area that detects whether the container is in the filling area;

wherein the controller is further configured to:

after the heated water brews the ground coffee in the upper compartment, when the presence sensor indicates that the container has been removed, actuate the capsule position actuator to move the capsule downward through the bottom of the vertical tube to the filling area for removal.

10. A coffee machine that grinds beans contained in capsules, comprising:

a vertical tube configured to receive a capsule, wherein the capsule comprises:

an outer sleeve that is hollow with a top seal and a bottom seal;

an inner container that fits within the outer sleeve, wherein the inner container comprises:

a lower compartment initially containing coffee beans;

an upper compartment that is initially empty; and, a filter between the lower compartment and the upper compartment;

a water reservoir;

a water heater;

a water pump;

a water spout that receives water from the water heater;

a water spout actuator coupled to the water spout and configured to extend the water spout into an interior of the vertical tube and to retract the water spout from the interior of the vertical tube;

a grinder;

a bean collector coupled to the grinder;

a bean collector actuator coupled to the bean collector and configured to extend the bean collector into the interior of the vertical tube and to retract the bean collector from the interior of the vertical tube;

a ground coffee chute coupled to the grinder;

a ground coffee chute position actuator coupled to the ground coffee chute and configured to extend the ground coffee chute into the interior of the vertical tube and to retract the ground coffee chute from the interior of the vertical tube;

a ground coffee chute vibration actuator coupled to the ground coffee chute;

a capsule holder within the vertical tube that holds the capsule when it is inserted into the vertical tube;

a capsule position actuator coupled to the capsule holder that moves the capsule vertically up and down within the vertical tube;

a seal opener configured to release the coffee beans from the lower compartment when the capsule position actuator moves the capsule to contact the seal opener, wherein the seal opener comprises:

one or more blades configured to cut open the top seal; and, one or more elements configured to engage with a top edge of the inner container to prevent the inner container from moving further upward;

a lid coupled to the seal opener;

a lid actuator coupled to the lid and configured to open the lid and to close the lid;

a filling area located below a bottom of the vertical tube and configured to receive a container that receives brewed coffee;

a presence sensor proximal to the filling area that detects whether the container is in the filling area;

a controller coupled to the bean collector actuator, the ground coffee chute position actuator, the ground coffee chute vibration actuator, the water pump, the water heater, the grinder, the lid actuator, the capsule position actuator, and the presence sensor, wherein the controller is configured to:

open the lid to receive the capsule;

extend the bean collector into the interior of the vertical tube;

close the lid upon receiving a start command;

move the capsule to contact the seal opener to release the coffee beans from the lower compartment;

collect the coffee beans in the bean collector and transport the coffee beans to the grinder;

retract the bean collector from the interior of the vertical tube;

activate the grinder to grind the coffee beans, yielding ground coffee;

move the capsule downward in the vertical tube and extend the ground coffee chute into the interior of the vertical tube to transport the ground coffee from the grinder through the ground coffee chute into the upper compartment;

13

14 vibrate the ground coffee chute while transporting the
ground coffee into the upper compartment;

retract the ground coffee chute from the interior of the
vertical tube;

extend the water spout into the interior of the vertical
tube;

activate the water pump and the water heater to pump
water from the water reservoir into the water heater,
and from the water heater through the water spout
into the upper compartment, wherein heated water
brews the ground coffee and brewed coffee flows
through the filter and exits from the lower compart-
ment into a container placed below the vertical tube;
and, after the heated water brews the ground coffee in the
upper compartment, when the presence sensor indi-
cates that the container has been removed, move the
capsule downward through a bottom of the vertical
tube to the filling area for removal.

\* \* \* \* \*